US00RE35288E

United States Patent [19]

Borg

[11] E Patent Number: Re. 35,288

[45] Reissued Date of Patent: Jul. 2, 1996

[54] CARRIER STRAP FOR BOTTLES OR JUGS

[75] Inventor: James C. Borg, Eugene, Oreg.

[73] Assignee: Oregon Precision Industries, Inc., Eugene, Oreg.

[21] Appl. No.: 356,862

[22] Filed: Dec. 15, 1994

Related U.S. Patent Documents

Reissue of:

[64] Patent No.: 5,306,060
Issued: Apr. 26, 1994
Appl. No.: 125,352
Filed: Sep. 22, 1993

U.S. Applications:

[63] Continuation of Ser. No. 919,213, Jul. 24, 1992, abandoned, which is a continuation-in-part of Ser. No. 914,691, Jul. 6, 1992, Pat. No. Des. 349,459.

[51] Int. Cl.[6] ..... B65D 71/00

[52] U.S. Cl. ..... 294/87.2; 206/151; 206/199

[58] Field of Search ..... 294/31.2, 87.2–87.28, 294/159, 160, 167, 169, 170; 206/139, 140, 142–145, 147, 148, 150, 151, 153, 158, 159, 161–163, 192, 199, 201, 427, 428; 215/100 A

[56] References Cited

U.S. PATENT DOCUMENTS

| | | | |
|---|---|---|---|
| D. 237,466 | 11/1975 | Calvert . | |
| D. 238,249 | 12/1975 | Erickson . | |
| 2,409,684 | 10/1946 | Jenkins | 294/87.22 |
| 2,710,219 | 6/1955 | Zalkind | 294/87.28 |
| 2,997,169 | 8/1961 | Poupitch | 294/87.2 X |
| 3,003,805 | 10/1961 | Glazer | 294/87.2 |
| 3,261,498 | 7/1966 | Erickson . | |
| 3,311,252 | 3/1967 | Swartwood et al. | 294/31.2 X |
| 3,421,790 | 1/1969 | Carson | 294/87.26 |
| 3,463,536 | 8/1969 | Updegraff et al. | 294/31.2 |
| 3,633,962 | 1/1972 | Erickson | 294/87.2 |
| 3,752,305 | 8/1973 | Heyne | 294/87.2 X |
| 4,063,771 | 12/1977 | Calvert | 294/87.2 |
| 4,090,729 | 5/1978 | Erickson | 294/31.2 |
| 4,093,295 | 6/1978 | Erickson | 294/87.2 |
| 4,159,841 | 7/1979 | Calvert | 294/87.2 |
| 4,231,605 | 11/1980 | Newman | 294/87.2 |
| 4,235,468 | 11/1980 | Erickson | 294/87.2 |
| 4,247,142 | 1/1981 | Erickson | 294/87.2 |
| 4,248,470 | 2/1981 | Yuda et al. | 294/87.2 |
| 4,249,766 | 2/1981 | Erickson | 294/87.2 |
| 4,360,231 | 11/1982 | Bolin | 294/87.2 |
| 4,448,452 | 5/1984 | Wood | 294/87.2 |
| 4,453,630 | 6/1984 | Helms et al. | 294/87.2 X |
| 4,471,987 | 9/1984 | Erickson | 294/87.2 |
| 4,509,639 | 4/1985 | Thompson | 294/87.2 X |
| 4,523,677 | 6/1985 | Schurmann | 294/87.2 X |
| 4,634,002 | 1/1987 | Delonghi | 294/87.2 X |
| 4,793,647 | 12/1988 | Marvin | 294/87.2 |
| 4,911,289 | 3/1990 | Bird | 294/87.2 X |
| 5,096,246 | 3/1992 | Cnare | 294/87.2 |

FOREIGN PATENT DOCUMENTS

| | | | |
|---|---|---|---|
| 436107 | 7/1991 | European Pat. Off. | 206/151 |
| 2195218 | 3/1974 | France . | |
| 2049653 | 3/1973 | Germany . | |
| 2144335 | 3/1973 | Germany | 294/87.2 |
| 77893 | 1/1951 | Norway | 294/87.2 |
| 478697 | 11/1969 | Switzerland | 294/87.2 |

*Primary Examiner*—Johnny D. Cherry
*Attorney, Agent, or Firm*—Chernoff, Vilhauer, McClung & Stenzel

[57] ABSTRACT

An integrally formed bottle or jug carrier strap for securely and comfortably carrying a pair of bottles or jugs by their neck. An elongate grip has rings at each end and a neck-retaining collar attached to the inner circumference of each ring. Scores on the underside of each ring cause the ring to break at the score when the rings are deformed, permitting the bottle or jug to easily be removed from the carrier strap.

13 Claims, 2 Drawing Sheets

CARRIER STRAP FOR BOTTLES OR JUGS

Matter enclosed in heavy brackets [ ] appears in the original patent but forms no part of this reissue specification; matter printed in italics indicates the additions made by reissue.

CROSS REFERENCE TO OTHER APPLICATIONS

This *is a reissue of U.S. application, Ser. No. 08/125,352, now U.S. Pat. No. 5,306,060 which* is a continuation of U.S. application, Ser. No. 07/919,213 filed on Jul. 24, 1992 now abandoned; which is a continuation-in-part of a U.S. design patent application, Ser. No. 07/914,691 filed on Jul. 6, 1992, *now U.S. Design Pat. No. D. 349,459,* entitled Carrier Strap for Milk Jug Containers.

BACKGROUND OF THE INVENTION

This invention relates to an inexpensive, integrally formed bottle or jug carrier strap for securely and comfortably carrying a pair of bottles or jugs by their neck.

Bottles and other liquid containers, in particular gallon containers, weigh a substantial amount. For example, a filled one gallon milk jug weighs approximately 8.3 pounds. Shoppers wishing to purchase multiple one gallon containers generally must use each hand to carry each container.

Bottle carriers which enable bottles to be carried by their neck are well known in the art, as shown by the following:

Erickson U.S. Pat. No. 4,235,468 discloses an integrally formed bottle carrier wherein the bottle necks are engaged in and supported by a substantially keyhole shaped opening. The bodies of the bottles themselves are clustered and secured by a plurality of integrally formed depending supports.

Erickson U.S. Pat. No. 4,471,987 describes and claims a bottle carder capable of carrying a plurality of bottles in a close cluster using a connecting band which is separated and apart from a bottle-engaging means mounted around the necks of the bottle.

Erickson U.S. Pat. No. 4,249,766 describes a two-element strapping mechanism, comprising a connecting band which is separated and apart from a bottle-engaging means around the bottle necks for carrying the bottles.

Erickson U.S. Pat. No. 4,093,295 describes an integrally-formed bottle carrier for carrying a row of bottles side by side by their necks. The bottles are locked into and removed from a plurality of uniformly based split collars which are mounted within individual frames interconnected in a single row by one or more longitudinally extending rigid bridging bars. The split collar is substantially keyhole shaped having splits in longitudinal direction. Oppositely disposed handles are also provided for.

Erickson U.S. Pat. No. 4,090,729 describes a strap for carrying a single bottle by the neck within a split ring opening within a frame member.

The above-mentioned prior art devices each rely upon a substantially keyhole-shaped split collar. Insertion and removal of a bottle is made by forcing open the angular portion of the collar. The bottle carriers are lifted by various means, including finger openings in the top of the device or handles which are pivotable upwardly.

SUMMARY OF THE INVENTION

The present invention relates to an inexpensive integrally formed bottle or jug carrying strap that enables the user to securely and comfortably carry a pair of bottles or jugs.

In a preferred embodiment, the apparatus includes an elongate grip with a ring fixedly attached to each end of the grip. Within each ring is a neck retaining collar attached to the inner circumference of the ring. The neck retaining collars are separated by laterally positioned gaps, forming a distal portion and a proximate portion. Radially aligned with the gaps are scores on the underside of the rings. Removal of the bottle or jug from the carrier strap is accomplished by deforming the ring slightly upward which will break the ring at the score, permitting the collar portions to move longitudinally relative to each other and permit the bottle or jug to be easily removed.

A principal benefit of the carrier strap of this invention is that there is no need to provide any additional structural elements to enable a pair of bottles or jugs to be securely and comfortably carried. The elongate grip allows the user's whole hand to grasp the loaded carrier mid-point between the load, resulting in a balanced, secure and comfortable hold.

Another important advantage of the carrier strap of this invention is that the neck retaining collars may be made quite stiff because removal of the bottle or jug does not require that the collar be designed to flex so as to allow the bottle or jug neck to be pulled back through the neck retaining collar.

The foregoing and other objectives, features, and advantages of the invention will be more readily understood upon consideration of the following detailed description of the invention, taken in conjunction with the accompanying drawings.

DETAILED DESCRIPTION OF THE DRAWINGS

Figures 1, 2:
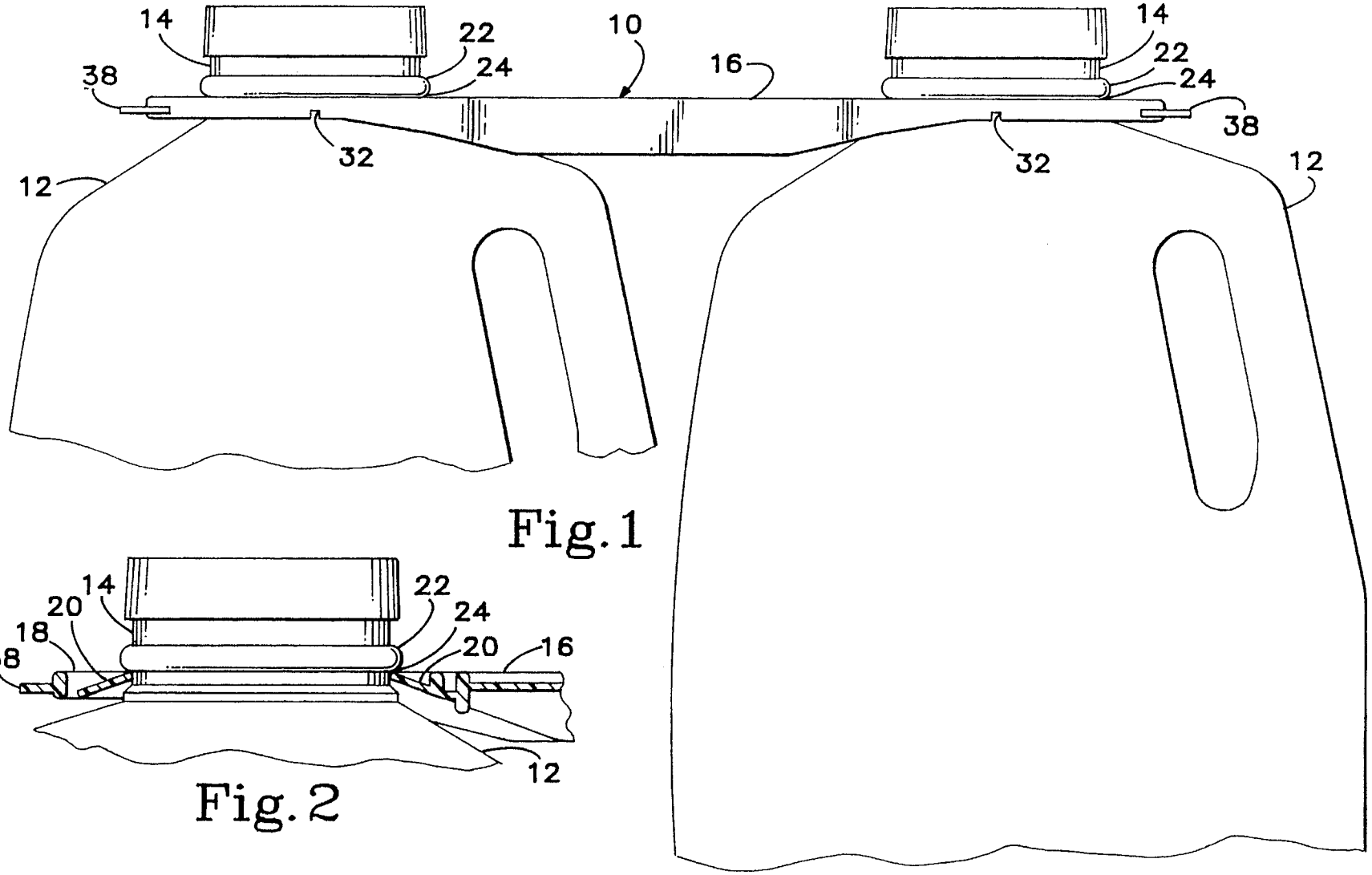
FIG. 1 is a side elevation view of a preferred embodiment of the bottle/jug carrying strap of the present invention showing two jugs mounted in the bottle or jug carrying strap.
FIG. 2 is a partial sectional view of the bottle/jug carrying strap showing the neck of a jug held within the neck retaining collar.

FIG. 1 is a side elevation showing the bottle/jug carrying strap 10 holding a pair of jugs 12 by the neck 14 thereof. When the jugs are inserted into carrying strap 10, they are held in close proximity side-by-side and the carrying strap 10 and jugs may be comfortably lifted and carried with one hand by holding the elongate grip 16.

The carrying strap 10 is inexpensive and easy to manufacture, being suitable for conventional plastic injection molding techniques. Recycled post-consumer polypropylene would be adequate as the major constituent material together with virgin material for the remainder.

Referring now to FIGS. 1 and 2, it can be seen that a pair of jugs 12 may easily be installed in the carrying strap 10 by placing the neck 14 of each jug 12 through the neck-retaining collar 20 in the ring 18 and pressing downward. Because the neck-retaining rings 18 conically taper upwards and are resilient, the respective neck-retaining collar 20 travels over the protruding ridge 22 of the neck 14 of the jug 12, snapping into place once it passes over the ridge 22, thereby holding the jug by nesting firmly under the lip 24 thereof.

Figure 3:
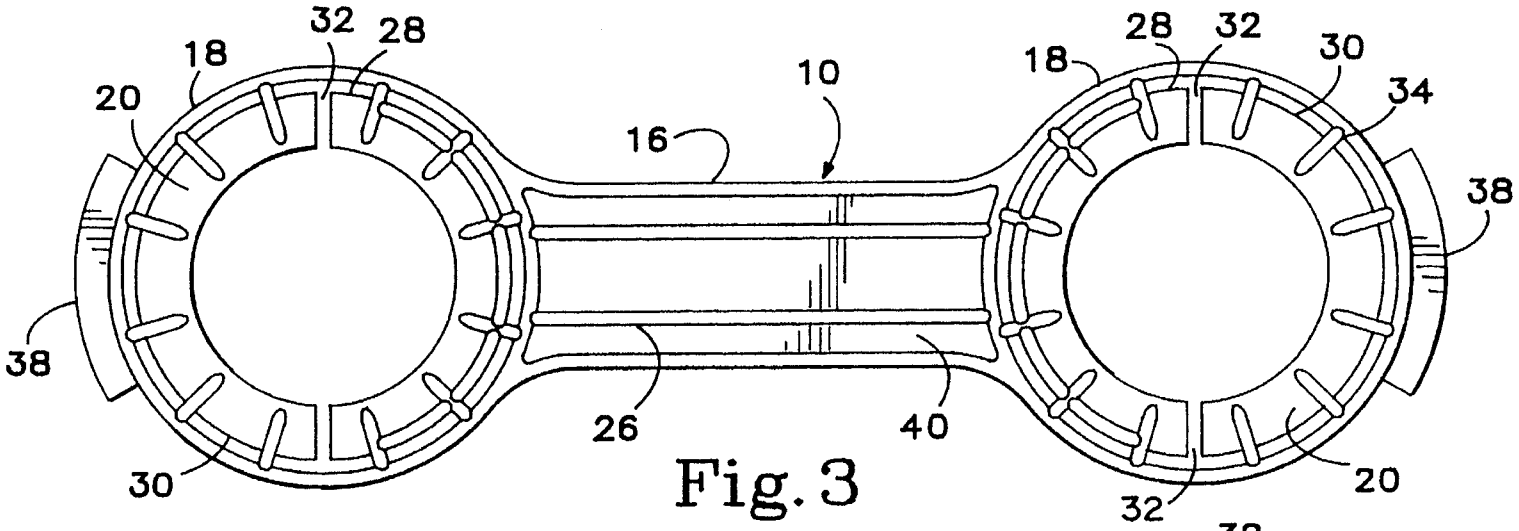
FIG. 3 is a top elevation view of the bottle/jug carrying strap.
Figure 4:
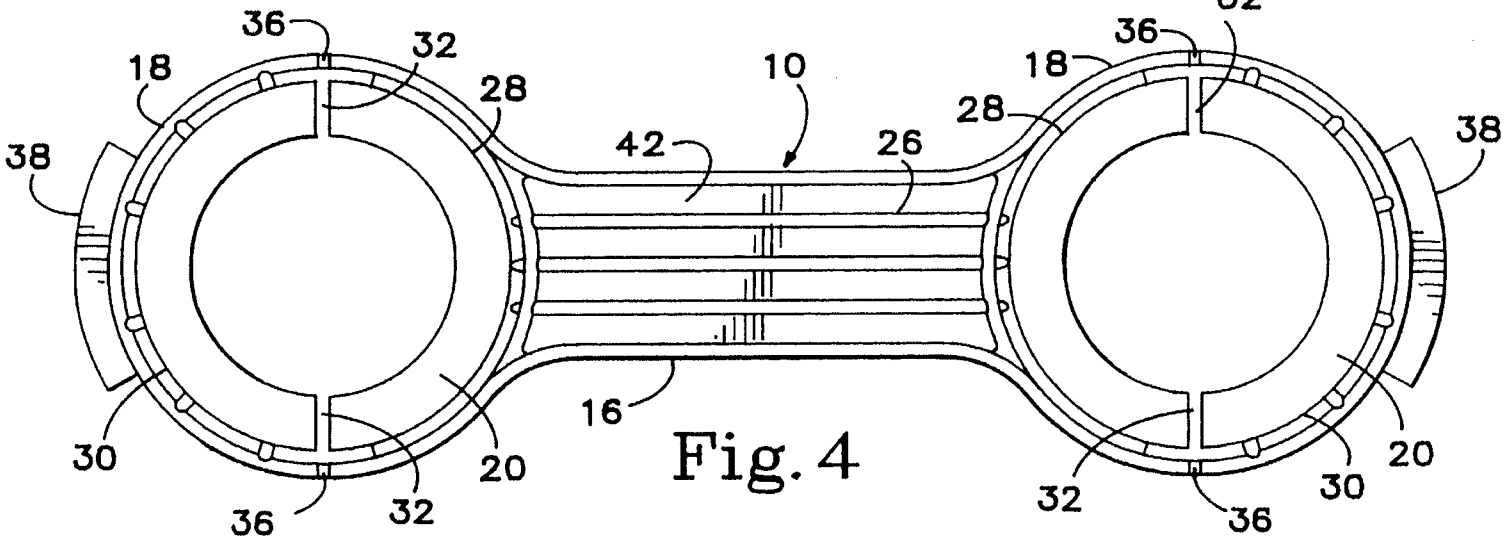
FIG. 4 is a bottom elevation view of the bottle/jug carrying strap.

Referring now to FIGS. 3 and 4, it can be seen that the elongate grip 16 includes ribbing 26 on both the top side 40 (FIG. 3) and bottom side 42 (FIG. 4) which provide rigidity to the carrying strap 10, while minimizing the amount of plastic needed.

Fixedly attached at each end of the elongate grip 16 are the rings 18. Attached to the inner circumference of each ring 18 is a neck-retaining collar 20 having a proximate portion 28 and a distal portion 30 formed by gaps 32.

The attachment of the proximate portion 28 of the neck-retaining collar 20 is substantially contiguous with the associated inner circumference of the ring 18.

On the top side 40 of the carrier strap 10, bridging connections 34 radiate inward from the inner circumference of the ring 18 and connect both the proximate portion 28 and the distal portion 30 of the neck-retaining collar 20 to their associated inner circumference of the ring 18. Unlike the proximate portion 28 which is substantially contiguously connected to the inner circumference of ring 18, the points of connection between the distal portion 30 and the ring 18 are bridging connections 34 only.

On the bottom side 42 of the rings 18, radially aligned with the gaps 32, are scores 36. Also located on the outer circumference of the rings 18 are tabs 38. If desired, instructions may be imprinted on the top of the tabs 38 instructing the user to "lift to remove". Lifting the tab 38 causes the ring 18 to deform and break at the scores 36, thereby releasing the jug from the neck retaining collar 20.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A one-piece carrier strap for carrying a pair of containers, such as jugs, narrow-necked bottles or the like, that are of a type having an enlarged neck portion, said strap comprising:

(a) an elongate grip having a pair of opposite ends;

(b) a pair of rings, each ring being fixedly attached to a respective one of said ends of said grip, each ring having a pair of scores formed therein; and (c) a respective neck-retaining collar within each ring, each collar having at least a pair of resiliently yieldable portions that progressively approach each other toward an upper side of said strap for yieldably receiving and springably retaining the enlarged neck portion of a respective container of said type that is inserted through said collar toward said upper side, said yieldable portions of each collar being, apart from the corresponding ring, completely separated from each other by at least a pair of gaps such that if either ring is stressed and thereby broken along said scores, then at least a pair of the corresponding yieldable portions are fully disconnected from each other.

2. The carrier strap of claim 1 wherein each neck-retaining collar is generally of frustoconical shape.

3. The carrier strap of claim 1 wherein each ring [includes] *has an interior circumference and an exterior circumference and* a tab portion *is* infrangibly attached to [the] *said* exterior circumference of [said] *each* ring.

4. The carrier strap of claim 1 wherein said grip further includes longitudinal ribs so formed as to provide substantial rigidity to said grip, said ribs being formed at least in part, along said upper side of said strap.

5. The carrier strap of claim 1 wherein said at least a pair of *the* corresponding yieldable portions are fully disconnected from each other in such a manner that the corresponding said collar is subsequently incapable of springably retaining the enlarged neck portion of a container of said type.

6. A one-piece carrier strap for carrying a pair of containers, such as jugs, narrow-necked bottles or the like, that are of a type having an enlarged neck portion, said strap comprising:

(a) an elongate grip having a pair of opposite ends;

(b) a pair of rings, each ring being fixedly attached to a respective one of said ends, each ring including a pair of divisible portions delineated from each other by a pair of scores formed in said ring;

(c) a respective neck-retaining collar within each ring, each collar having at least a pair of resiliently yieldable portions that progressively approach each other toward an upper side of said strap for yieldably receiving and springably retaining the enlarged neck portion of a respective container of said type that is inserted through said collar toward said upper side; and (d) at least a pair of said yieldable portions within each ring being independently connected to said ring such that if either ring is sufficiently stressed along said scores as to cause the corresponding said divisible portions to completely disconnect from each other, then the corresponding said at least a pair of said yieldable portions similarly are fully disconnected from each other.

7. The carrier strap of claim 6 wherein said at least a pair of said yieldable portions are fully disconnected from each other in such a manner that the corresponding said collar is subsequently incapable of springably retaining the enlarged neck portion of a container of said type.

8. The carrier strap of claim 6 *wherein each ring has an interior circumference and an exterior circumference and* further including a respective tab portion infrangibly attached to [the] *said* exterior circumference of each ring.

9. The carrier strap of claim 8 wherein each tab portion is located in circumferentially spaced position from the corresponding said pair of scores whereby, due to levering action, there is an increase in the maximum amount of stress imposed on each ring along each score when a predetermined amount of lifting force is applied to the corresponding said tab portion.

10. A one-piece carrier strap for carrying a pair of containers, such as jugs, narrow-necked bottles or the like, that are of a type having an enlarged neck portion, said strap comprising:

(a) an elongate grip having a pair of opposite ends;

(b) a pair of rings, each ring being fixedly attached to a respective one of said ends, each ring including a pair of divisible portions delineated from each other by a pair of scores formed in said ring;

(c) a respective neck-retaining collar within each ring, each collar having at least a pair of resiliently yieldable portions that progressively approach each other toward an upper side of said strap for yieldably receiving and springably retaining the enlarged neck portion of a respective container of said type that is inserted through said collar toward said upper side; and (d) said yieldable portions being so arranged within each ring that if either ring is sufficiently stressed along said scores as to cause permanent dislocation of the corresponding said divisible portions, then the corresponding said yieldable portions are subsequently incapable of springably retaining the enlarged neck portion of a container of said type.

11. The carrier strap of claim 10 *wherein each ring has an interior circumference and an exterior circumference and* further including a respective tab portion infrangibly attached to [the] *said* exterior circumference of each ring.

12. The carrier strap of claim 11 wherein each tab portion is located in circumferentially spaced position from the corresponding said pair of scores whereby, due to levering action, there is an increase in the maximum amount of stress imposed on each ring along each score when a predetermined amount of lifting force is applied to the corresponding said tab portion.

13. A one-piece carrier strap for carrying a pair of containers, such as jugs, narrow-necked bottles or the like, that are of a type having an enlarged neck portion, said strap comprising:

(a) an elongate grip having a pair of opposite ends;

(b) a pair of outer supporting members, each member being fixedly attached to a respective one of said ends and including an arcuately extending inner edge;

(c) a pair of neck-retaining collars each of generally annular shape and having an exterior circumference, each collar being supported from the inner edge of a corresponding one of said supporting members by a plurality of bridging connections that extend radially outwardly from said exterior circumference, each collar including at least a pair of resiliently yieldable arcuate-shaped portions that progressively approach each other toward an upper side of said strap for yieldably receiving and springably retaining the enlarged neck portion of a respective container of said type that is inserted through said collar toward said upper side, each arcuate-shaped portion including a curved outside edge bordering said exterior circumference of the corresponding said collar; and (d) an arcuately extending rib being formed along at least a major extent of said outside edge of at least one of said arcuate-shaped portions on each collar for resisting overstressing of each respective at least one arcuate-shaped portion by distributing any force applied to a minor portion of each respective at least one arcuate-shaped portion over a major portion thereof as when said minor portion is acted upon by the enlarged neck portion of a respective container of said type while said enlarged neck portion is tilted relative to the corresponding collar during insertion through said corresponding collar.

* * * * *

UNITED STATES PATENT AND TRADEMARK OFFICE

CERTIFICATE OF CORRECTION

PATENT NO. : RE.35288

DATED : July 2, 1996

INVENTOR(S) : James C. Borg

It is certified that error appears in the above-indentified patent and that said Letters Patent is hereby corrected as shown below:

Col. 1, line 37: delete "carder" and insert -- carrier --.

Signed and Sealed this

Twenty-fifth Day of February, 1997

*Attest:*

Bruce Lehman

BRUCE LEHMAN

*Attesting Officer*

*Commissioner of Patents and Trademarks*